United States Patent
Saito et al.

(10) Patent No.: US 6,351,316 B2
(45) Date of Patent: *Feb. 26, 2002

(54) INTERNET FACSIMILE APPARATUS AND INFORMATION TERMINAL DEVICE

(75) Inventors: Kyoji Saito, Kawasaki; Kiyoshi Toyoda, Kunitachi, both of (JP)

(73) Assignee: Matsushita Graphic Communication Systems, Inc., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/104,177

(22) Filed: Jun. 25, 1998

(30) Foreign Application Priority Data

Jun. 30, 1997 (JP) .............................. 9-189176

(51) Int. Cl.[7] .............................. H04N 1/00
(52) U.S. Cl. .................. 358/1.15; 358/402; 379/100.01
(58) Field of Search ................................ 358/434, 468, 358/440, 402, 403, 407, 1.15, 442; 395/200.3, 200.31, 200.35, 200.36, 200.53, 200.58, 200.62, 200.75; 707/10; 709/238, 239, 242; 379/100.01, 100.09

(56) References Cited

U.S. PATENT DOCUMENTS

| | | | |
|---|---|---|---|
| 5,490,243 A | * 2/1996 | Millman et al. | 707/507 |
| 5,521,719 A | 5/1996 | Yamada | |
| 5,630,062 A | * 5/1997 | Okutsu | 395/200.03 |
| 5,647,002 A | * 7/1997 | Brunson | 379/93.24 |
| 5,751,960 A | * 5/1998 | Matsunaga | 395/200.36 |
| 5,802,260 A | * 9/1998 | Shimakawa et al. | 358/1.15 |
| 5,805,810 A | * 9/1998 | Maxwell | 395/200.36 |
| 5,812,278 A | * 9/1998 | Toyoda et al. | 358/402 |
| 5,826,034 A | * 10/1998 | Albal | 709/239 |
| 5,838,685 A | * 11/1998 | Hochman | 370/428 |
| 5,848,137 A | * 12/1998 | Hsiao | 379/110.01 |
| 5,881,233 A | * 3/1999 | Toyoda et al. | 395/200.48 |
| 5,886,793 A | * 3/1999 | Satou | 358/404 |
| 5,898,824 A | * 4/1999 | Kato et al. | 358/1.16 |
| 5,905,777 A | * 5/1999 | Foladare et al. | 379/90.01 |
| 5,905,783 A | * 5/1999 | Tonegawa | 379/100.07 |
| 5,909,493 A | * 6/1999 | Motoyama | 713/154 |
| 6,023,700 A | * 2/2000 | Owens et al. | 707/10 |

FOREIGN PATENT DOCUMENTS

| | | |
|---|---|---|
| EP | 652666 | 5/1995 |
| EP | 0 679 013 | * 10/1995 |
| EP | 679013 | 10/1995 |
| EP | 0818916 | 1/1998 |
| JP | 8-130554 | 5/1996 |
| JP | 8-204937 | 8/1996 |
| JP | 9-116728 | 5/1997 |
| JP | 9-139787 | 5/1997 |
| JP | 10-28217 | 1/1998 |
| JP | 10-282217 | 1/1998 |

OTHER PUBLICATIONS

An English language abstract of JP 10–28217.
English Language Abstract of JP No. 8–130554.
English Language Abstract of JP No. 9–116728.
English Language Abstract of JP No. 9–139787.
English Language Abstract of JP No. 8–204937.
English Language Abstract of JP No. 10–28217.

* cited by examiner

*Primary Examiner*—Edward Coles
*Assistant Examiner*—Joseph R. Pokrzywa
(74) *Attorney, Agent, or Firm*—Greenblum & Bernstein, P.L.C.

(57) ABSTRACT

In the case where received e-mail data can not be printed, e-mail control section 33 transfers the received e-mail data to another information terminal device. And facsimile control section 34 instructs facsimile section 27 to print an error message including sender information and an attached file format. And indication control section 35 starts up indication section 29.

10 Claims, 7 Drawing Sheets

Received: from ifaxp53. rdmg. mgcs.
   mei. co. jp by cads0
   rdmg. mgcs. mei. co. jp with SXTP
   (1. 38. 193. 4/16. 2)idAA22607: Wed.
   18 Jun 1997 16:57:06 0900

Message−Id: <9706180758, AAD0008@1
   laxp54. rdmg. mgcs. mei. co. jp>

From: KYOJI SAITO <kyoji@rdmg.    ⟶  SENDER
   mgcs. mei. co. jp>                  ADDRESS Date: Wed, 18 Jun 1997 16:58:29 0900

To: iFax@iFax01. rdmg. mecs. mei. co. jp

Subject: Test
Name−Version: 1.0

X−Mailer: AL−Mail 1. 32                   HEADER INFOR-MATION Content−Type: multipart/mixed;
   boundary
   ="    0407645252712732

Content−Type: application/ociet−siream  ⟶  ATTACHED
   ="SPEC. DOC"                   FILE FORMAT Content−Transfer−Encoding: base64

Content−Disposition: attachment:filename
   ="SPEC. DOC"

```
* * * * * * * * * * * * * *
*                          *
*  THIS MAIL INCLUDES AN ATTACHED  *
*  FILE UNPRINTABLE BY FACSIMILE   *
* * * * * * * * * * * * * *
```
TEMPLATE DOCUMENT

INTERNET FACSIMILE APPARATUS AND INFORMATION TERMINAL DEVICE

BACKGROUND OF THE INVENTION

1. Field of the Invention

The present invention relates to an Internet facsimile apparatus for transmitting and receiving image data using an e-mail system.

2. Description of Related Art

Generally an information terminal device such as a personal computer comprises a large-capacity memory device and stores all received data at the memory device. A user identifies the data content indicated on a display screen before decides whether or not the data is printed at a printer.

On the contrast, since an Internet facsimile apparatus for transmitting and receiving image data using an e-mail system does not have an enough-capacity memory device, it converts the received data into facsimile data sequentially to print, and deletes sequentially the data which printing is completed. A user recognizes the received data content by identifying a recording paper on which the data is printed.

Figure 1:
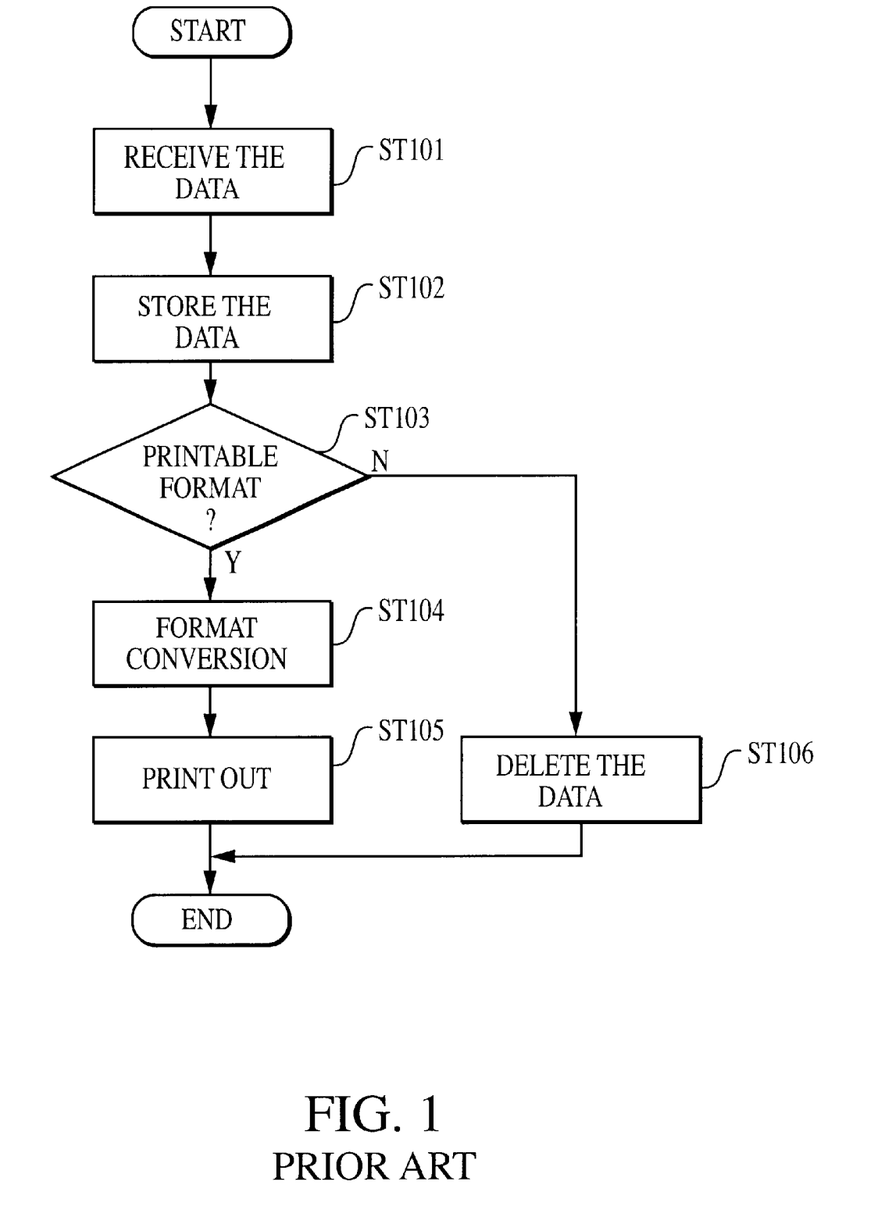
FIG. 1 is a flow chart illustrating the processing of data reception up to printing at a conventional Internet facsimile apparatus.

The processing of data reception up to printing at a conventional Internet facsimile apparatus is explained using a flow chart in FIG.1 in the following.

First the e-mail data received at an Internet facsimile apparatus is temporally stored (ST101 and ST102).

And it is decided whether or not the stored data is printable (ST103), then when it is possible to print the stored data, the stored data is converted into a facsimile format and printed (ST104 and ST105). On the other hand, when it is impossible to print the stored data, the stored data is deleted (ST106).

As described above, in the case of receiving an unprintable e-mail data, since the conventional Internet facsimile apparatus deletes the data, a user can not recognize that the data is received and either can not identify the data content even using another method.

SUMMARY OF THE INVENTION

The object of the present invention is to provide an Internet facsimile apparatus in which, when an unprintable e-mail data is received, a user can recognize that the data is received and can identify the data content.

The object of the present invention is achieved, when an unprintable e-mail data is received, by printing an error message including sender information and an attached file format, and transferring information concerning the reception of an unprintable e-mail to another information terminal device.

DESCRIPTION OF THE PREFERRED EMBODIMENT

The embodiment of the present invention is explained in detail with reference to drawings in the following.

Figure 2:
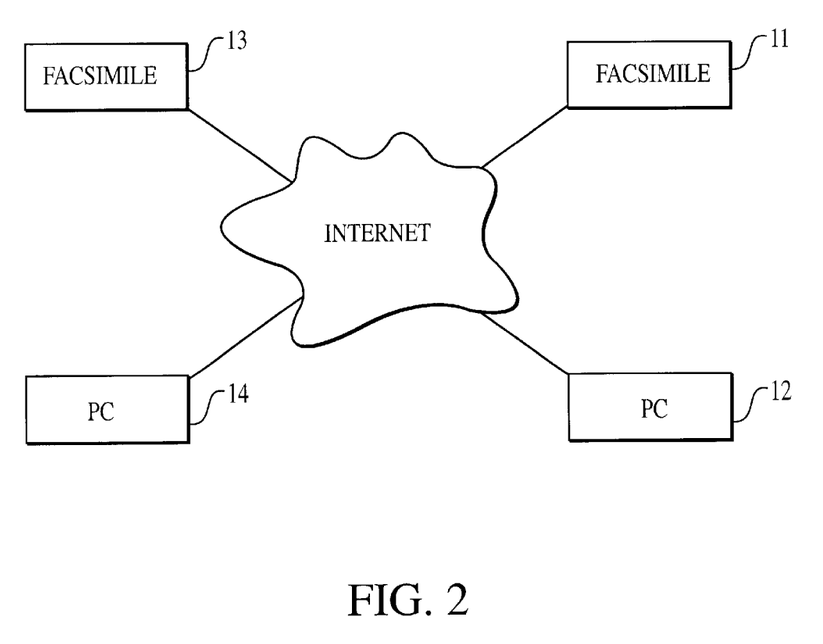
FIG. 2 is a network configuration diagram including an Internet facsimile apparatus in the embodiment of the present invention.

FIG. 2 is a network configuration diagram including an Internet facsimile apparatus in the embodiment of the present invention.

In FIG. 2, the e-mail data transmitted from another Internet facsimile apparatus 11 or personal computer 12 is received at Internet facsimile apparatus 13 in the embodiment of the present invention via the Internet. To communicate via the Internet, the document data of an e-mail is converted into the text format. And the image data, voice data and so on are also converted into the text format, and transmitted and received as an attached file to document data.

Internet facsimile apparatus 13 format converts a received data into facsimile data to print. At this time, in the case where the received data includes the data that can not be format converted into facsimile data, it is transferred to another information terminal 14 such as a personal computer.

Figure 3:
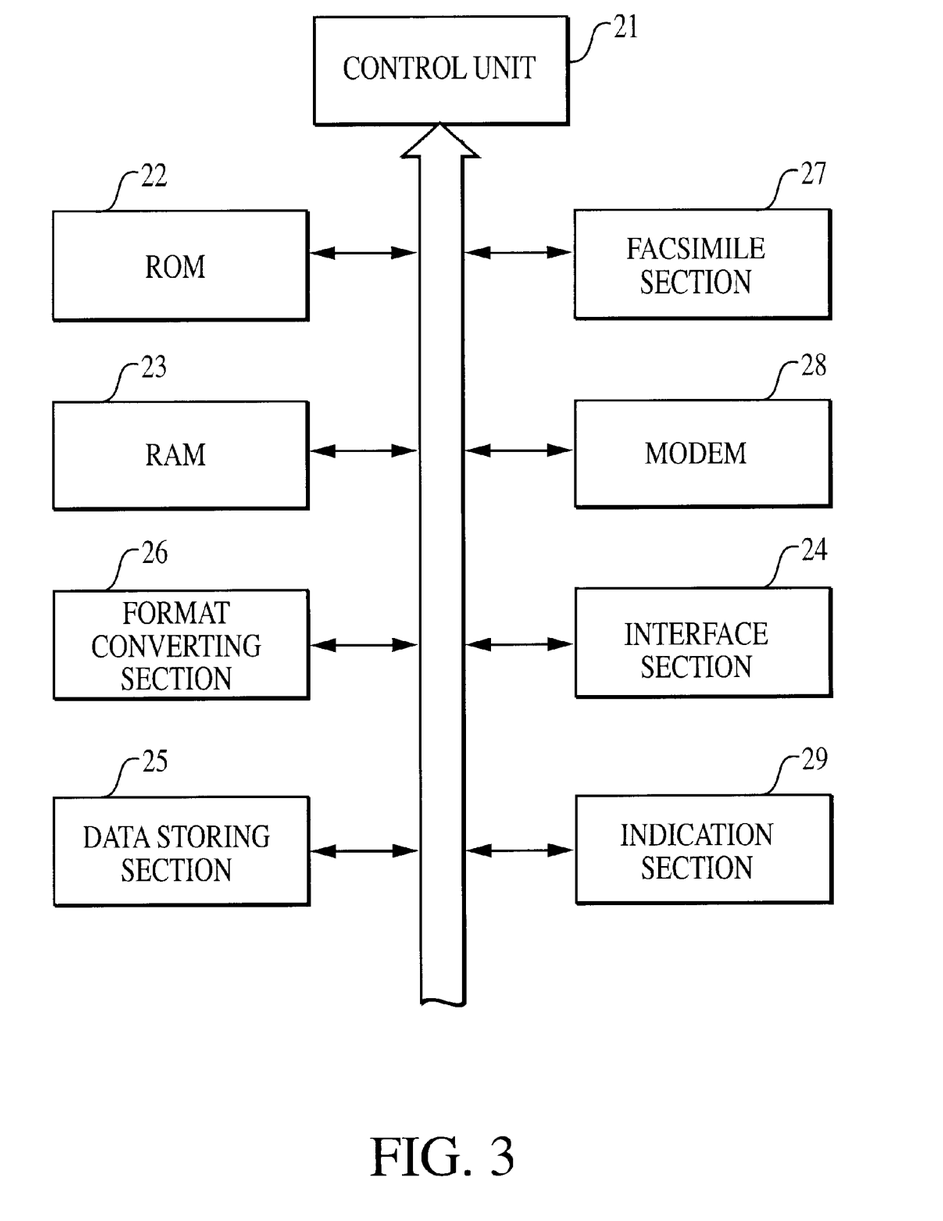
FIG. 3 is a block diagram illustrating a basic configuration of an Internet facsimile apparatus in the embodiment of the present invention.

Next the basic configuration of an Internet facsimile apparatus of the present invention is explained with a block diagram in FIG. 3.

As illustrated in FIG. 3, an Internet facsimile apparatus is primarily composed of control unit 21 for providing controls of data identification, data recognition and so on, ROM 22 for storing a program, RAM 23 to be used as a data area of the program, interface section 24 for executing a procedure necessary to transmit and receive data by e-mail, data storing section 25 to store the received data temporally, format converting section 26 for converting the format of the received data, facsimile section 27 for reading an original paper and printing the received data, modem 28 for modulating and demodulating the data transmitted and received between telephone lines and LAN and indication section 29 for notifying the reception of data to a user.

Figure 4:
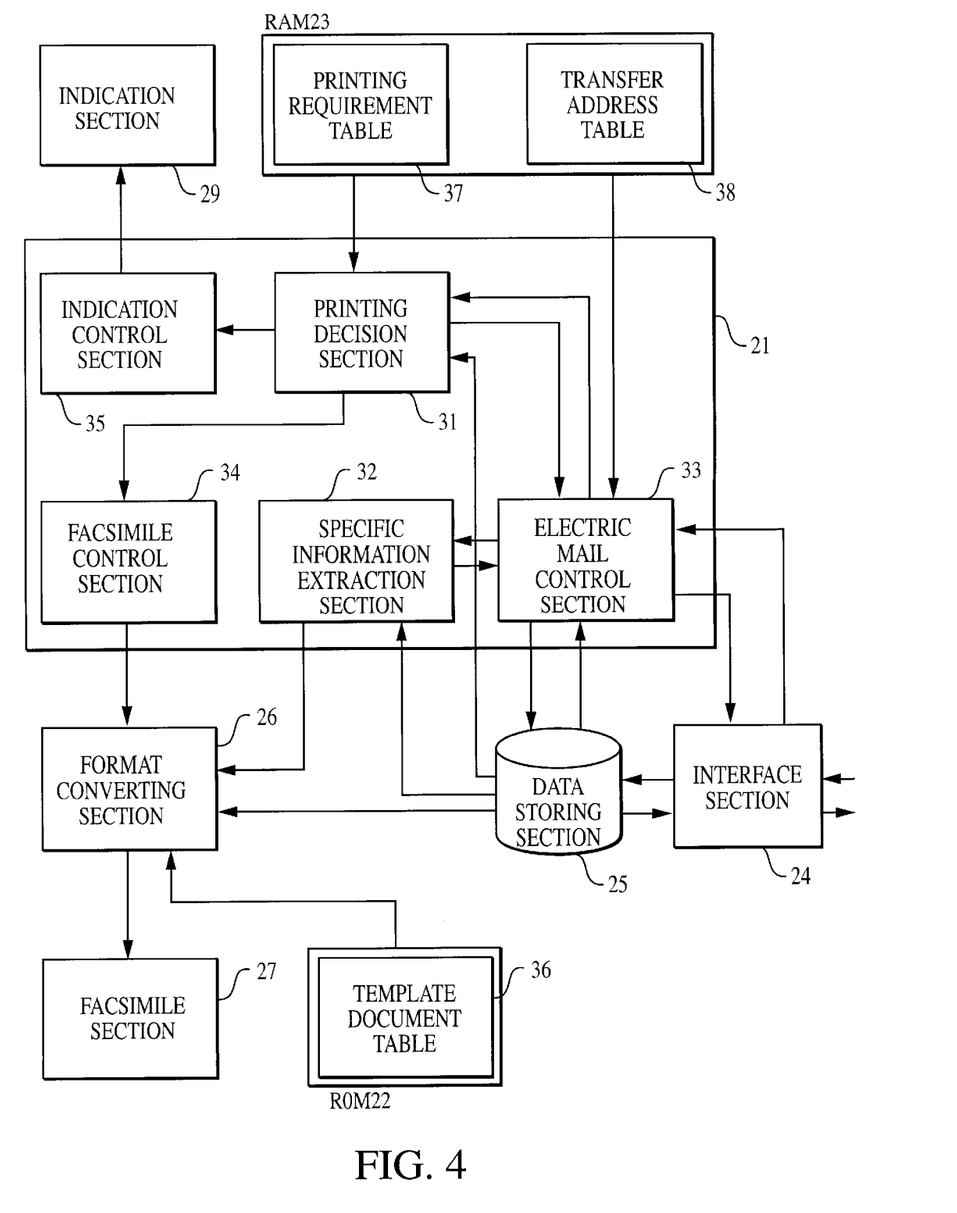
FIG. 4 is a function diagram illustrating a function of control section at an Internet facsimile apparatus in the embodiment of the present invention.

Next the function of control unit 21 at an Internet facsimile apparatus in the embodiment of the present invention is explained with a function diagram illustrated in FIG. 4.

As illustrated in FIG. 4, control unit 21 is composed of primarily printing decision section 31 for deciding whether or not the stored e-mail data (hereinafter called "stored data") is printable, specific information extracting section 32 for extracting the necessary information from the stored data, e-mail control section 33 for control the transmission and reception of e-mail data, facsimile control section 34 for controlling the transmission and reception of facsimile data, and indication control section 35 for controlling indication section 29.

ROM 22 has template document memory table 36 in which a template document attached to an error message is memorized. RAM 23 is for printing requirement table 37 in which the requirement to print at the Internet facsimile apparatus is registered and transfer address table 38 in which an address to transfer the data is registered.

Printing decision section 31 decides whether or not the file format of the stored data at data storing section 25 meets the requirement memorized in advance in printing requirement table 37 at RAM 23. And it outputs the decision result to e-mail control section 33, facsimile control section 34 and indication control section 35.

Specific information extracting section 32 predetermines specific codes such as "From:" indicating a mail address of a sender, "Content-Type:" indicating a format of an attached file, and extracts the specific information set by the predetermined specific codes from the stored data. In addition, all of header information may be extracted as specific information.

E-mail control section 33 instructs printing decision section 31 to execute the decision processing when e-mail data are stored at data storing section 25. And e-mail control section 33 instructs specific information extracting section 32 to execute the extraction processing when printing decision section 31 decides that the stored is unprintable, concurrently acquires an address of a information terminal device to be transferred from transfer address table 38 and transfers the extracted specific information from interface section 24 to the information terminal device to be transferred.

In addition, another method to acquire a transfer destination address is to insert an address of information terminal device to be transferred in head information and read it. By using this method, when the transmitted data is unprintable at an Internet facsimile apparatus, a sender can transfer the data to an information terminal device at the predetermined transfer destination address without other procedures. And e-mail section 33 may acquire an address of the sender from the head information and return the received data to the sender.

And e-mail control section 33 transmits the stored data to an information terminal device to be transferred if it gets the transfer instruction from the information terminal device to be transferred. On the contrast, it deletes the stored data if it gets the deleting instruction from the information terminal device to be transferred.

And in the case where printing decision section 31 decides that the stored data is printable, facsimile control section 34 instructs format converting section 26 to convert the stored data into the facsimile data and instructs facsimile section 27 to print the converted facsimile data.

And in the case where printing requirement decision section decides that the stored data is unprintable, facsimile control section 34 instructs format converting section 26 to convert the specific information extracted at specific information extracting section 32 into the facsimile data and instructs facsimile section 27 to print an error message including the converted specific information attached a template document registered in template document table 36 at ROM 22.

In the case where printing decision section 31 decides that the stored data is unprintable, indication control section 35 start up indication section 29. The start up of indication section 29 includes indicating a ramp or buzzing a buzzer. By this manner, a user can confirm that the reception of the data unprintable at an Internet facsimile apparatus early, which allows him/her to take an action to deal it fast, such as transferring the received data to another information terminal device and identifying the content at the information terminal device to be transferred.

In addition, to use a printer at facsimile section 27 effectively, the apparatus in the embodiment of the present invention has the configuration where format converting section 26 converts the stored data into the facsimile data such as MH data and outputs it to facsimile section 27, then facsimile section 27 converts the facsimile data into the printable data and prints it. However the configuration of the apparatus according to the present invention is not limited by the embodiment described above. It is also preferable that format converting section 26 converts the stored data into the facsimile data, further converts it into the printable data and outputs it to facsimile section 27. For instance, in the case where the Internet facsimile apparatus receives the text data, format converting section 26 converts the character code data into the bit map data and outputs it to facsimile section 27.

Figure 5:
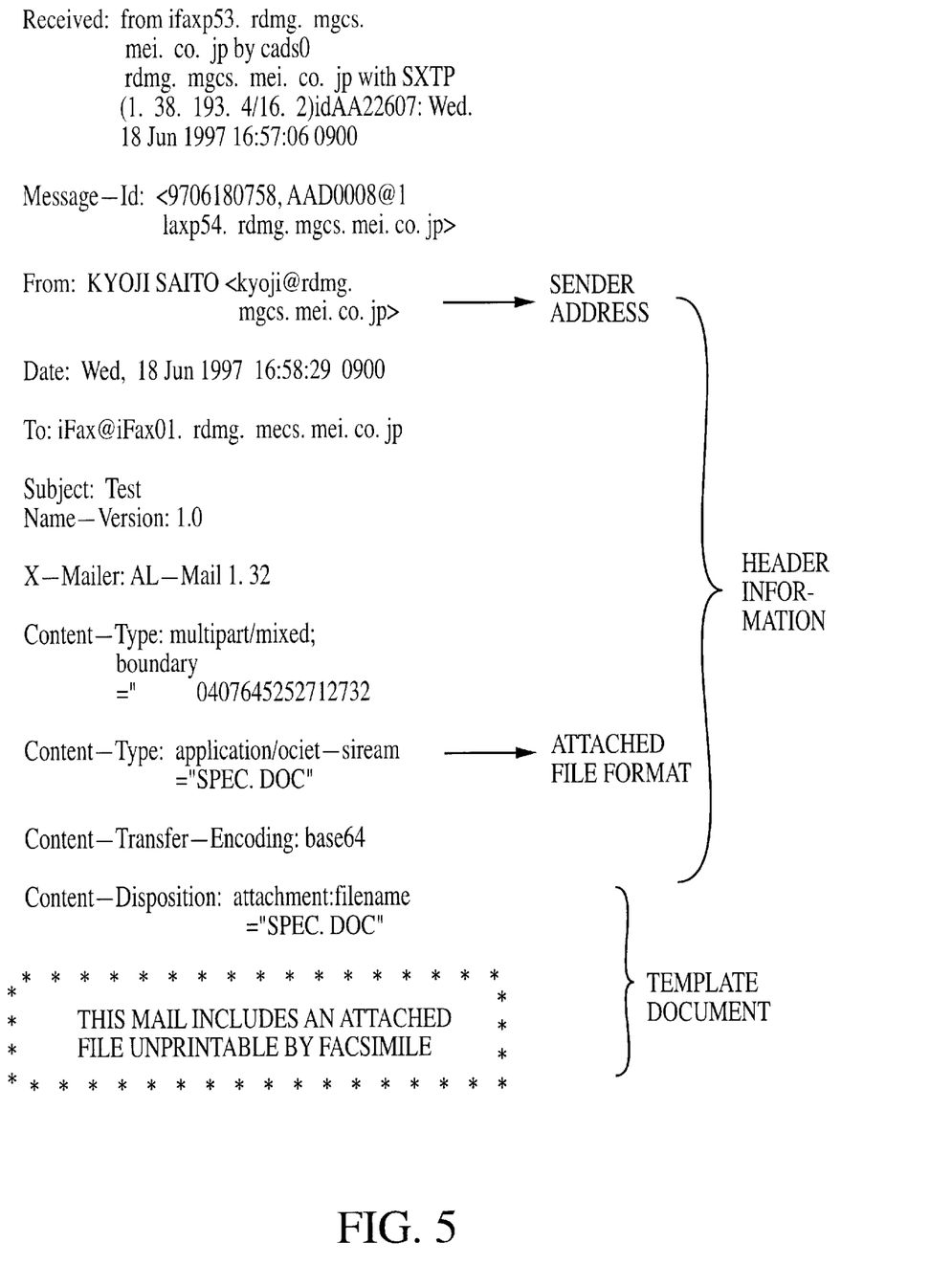
FIG. 5 is a diagram illustrating an example of an error message printed at an Internet facsimile apparatus in the embodiment of the present invention.

Next FIG. 5 is used to illustrate an example of an error message printed at facsimile section 27 at an Internet facsimile apparatus in the embodiment of the present invention. As illustrated in FIG. 5, an error message is composed of a mail address of a sender recorded after "From:", header information including a format of attached file recorded after "Content-Type:" and a template document.

By seeing the content of the error message, since a user can confirm the reception of data unprintable at the Internet facsimile apparatus and the sender of the data, he/she can take an action to deal it fast such as notifying that the reception of the unprintable data to the sender.

Figure 6:
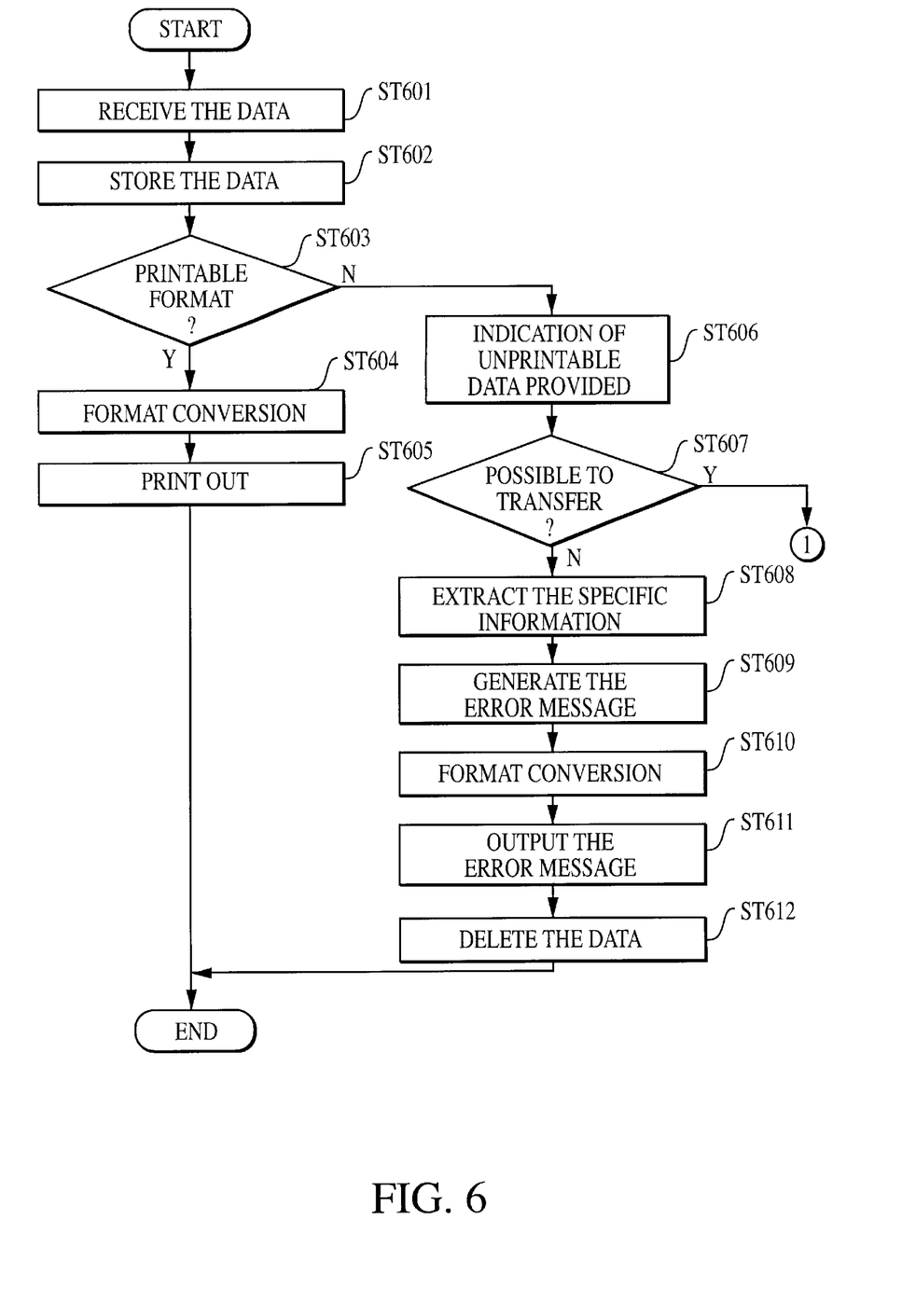
FIG. 6 and FIG. 7 are flow charts illustrating the processing of data reception up to printing at an Internet facsimile apparatus in the embodiment of the present invention.
Figure 7:
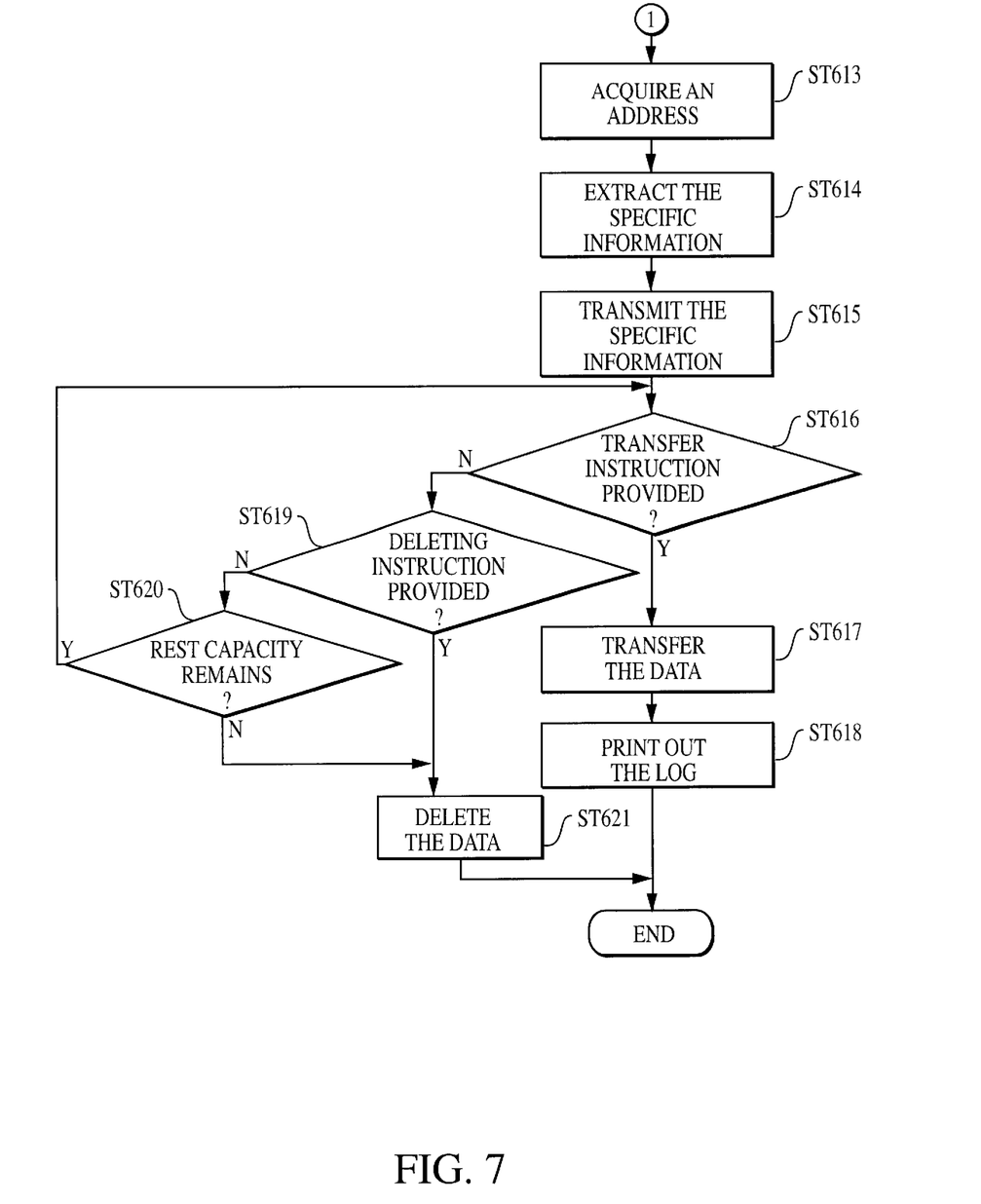

Next flow charts in FIG. 6 and FIG. 7 are use to explain the processing of data reception up to printing at an Internet facsimile apparatus in the embodiment of the present invention.

First an e-mail transmitted from a personal computer or another Internet facsimile apparatus is received interface section 24 via the Internet (ST601) and stored temporally at data storing section 25 (ST602).

Next printing decision section 31 compares the stored data with the requirements registered in printing requirement table 37 and decides whether or not it is printable (ST603). For instance, in the case where it is registered in printing requirement table 37 that the printable data format is only TIFF and the printable data capacity per a page is less than 1 MB, printing decision section 31 first decides whether or not the data is the TIFF format. If the stored data is the TIFF format, it is decided whether or not the data volume per a page of the stored data is less that 1 MB.

In the case where the stored data is decided printable, by the instruction from facsimile control section 34, the stored data is converted into the facsimile data at format converting section 26 (ST604) and printed at facsimile section 27 (ST605).

And in the case where the stored data is decided unprintable, indication section 29 is first started up by the instruction from indication control section 35 (ST606). By this manner, a user can confirm the reception of the data unprintable at the Internet facsimile apparatus.

Concurrently e-mail control section 33 decides whether or not the stored data can be transferred to another information terminal device (ST607). The decision on the transfer is performed by deciding whether or not the transfer flag is set, in other words, another information terminal device is prepared as a transfer destination. In addition, it is possible to designate the sender as an information terminal device to be transferred.

In the case where the stored data can not be transferred, the header information is extracted from the stored data at specific information extracting section 32 (ST608), to which a template document registered in ROM 22 is attached, then the error message is generated (ST609). The generated error message is, by the instruction from facsimile control section 34, converted into the facsimile data at format converting section 26 (ST610) and printed at facsimile section 27 (ST611). By this manner, a user can confirm the sender of the received data, which permits him/her to take an action to deal it fast such as notifying the sender that the reception of the unprintable data.

And after the error message is printed, the stored data is deleted by the instruction from email section 33 (ST612).

In the case where the stored data can be transferred, e-mail control section 33 acquires an address of an information terminal device to be transferred (ST613). As a method to acquire the address, for instance, to insert an address of an information terminal device to be transferred in head information of the data, to register in advance an address of an information terminal device to be transferred in RAM and to designate it every time by inputting with key by receiver are considered.

Next specific information extracting section 32 extracts specific information including a mail address of a sender and an attached file format from head information of the stored data (ST614), and e-mail control section 33 instructs to transmit the specific information to the information terminal device to be transferred (ST615). By this manner, a user of the information terminal device to be transferred can obtain the information on the sender of the data, and select whether the data is transferred or deleted.

In the case where an information terminal device to be transferred instructs to transfer the data (ST616), e-mail control section 33 instructs to transfer the stored data to an information terminal device to be transferred (ST617). And facsimile section 27 prints the transfer result as log information (ST618).

In the case where an information terminal device to be transferred instructs to deleted the data (ST619), or in the case where the rest capacity of a memory device at an Internet facsimile device is reduced, for instance in the case where another data is received without any instruction (ST620), e-mail control section 33 instructs to delete the stored data (ST621).

In addition in the present invention, although the specific information is transmitted before the stored data is transferred to an information terminal device to be transferred, it is also preferable to transfer the stored data immediately after the address acquisition depending on the user's requirement. And even in the case where the stored data was transferred, it is possible to print an error message by programming the operation of the control unit. And in the case where a part of the stored data is printable, it is possible to print only the part by programming the operation of the control unit.

As described above, the present invention can provide the Internet facsimile apparatus in which, in the case of receiving an unprintable e-mail, a user can recognizes the reception of the data and identifies the data content.

What is claimed is:

1. An internet facsimile apparatus comprising:
a printer that prints received data;
an interface that receives and transmits e-mail data, the e-mail data comprising image data and specific information, the specific information comprising at least a type of data; and
a controller that is controllably connected to the printer and to the interface, the controller determining whether or not e-mail data received by the interface can be printed by the printer based on the type of data;
said controller, in response to a determination that the e-mail data cannot be printed by the printer, extracting the specific information from the e-mail data, and transmitting the specific information to a recipient information terminal apparatus through the interface,
said controller, in response to receipt of an instruction from the recipient information terminal apparatus to transfer the e-mail, transmits the e-mail data to the recipient information terminal apparatus.

2. The apparatus according to claim 1, wherein the controller determines that the e-mail data can be printed by the printer when the type of data comprises a file appended to the e-mail that is a TIFF file, and the controller determines that e-mail data cannot be printed by the printer when the appended file is not a TIFF file.

3. The apparatus according to claim 1, wherein the controller determines that the e-mail data cannot be printed by the printer when a volume of image data, corresponding to one page of an original, included in an appended file of the e-mail data, exceeds a predetermined value, and the controller determines that the e-mail can be printed by the printer when the volume of image is equal to or less than the predetermined value.

4. The apparatus according to claim 1, further comprising an indicator that indicates that the e-mail data cannot be printed when the controller determines that the received e-mail data cannot be printed.

5. The apparatus according to claim 1, wherein the controller instructs the printer to print a message including information indicating that the e-mail data cannot be printed, when the controller determines that received e-mail data cannot be printed.

6. The apparatus according to claim 1, wherein the recipient information terminal apparatus comprises a personal computer.

7. An internet facsimile apparatus comprising:
a facsimile device that scans a document and prints received data;
a modem that modulates and demodulates data;
an interface that receives and transmits e-mail data, the e-mail data comprising image data and specific information, the specific information comprising at least a type of data; and
a controller controllably connected to the facsimile device, the modem, and the interface, the controller controlling the facsimile device and the modem when receiving facsimile data, and controlling the interface when receiving e-mail data, the controller determining whether or not the e-mail data can be printed by the facsimile device, based on the type of data, when receiving the e-mail data;
said controller, in response to a determination that the e-mail data cannot be printed by the facsimile device, extracting the specific information from the e-mail data, and transmitting the specific information to a predetermined information terminal apparatus through the interface,
said controller, in response to receipt of an instruction from the predetermined information terminal apparatus, transmitting the e-mail data to the predetermined information terminal apparatus.

8. An internet facsimile apparatus comprising:
a facsimile device that scans a document and prints received data;
a modem that modulates and demodulates data;
an interface that receives and transmits e-mail data, the e-mail data comprising image data and specific information, the specific information comprising at least a type of data;

a converter that converts the received e-mail data to facsimile data; and a controller controllably connected to the facsimile device, the modem, the interface and the converter, the controller controlling the facsimile device and the modem when receiving facsimile data, and controlling the interface when receiving e-mail data, the controller determining whether or not the e-mail data can be printed by the facsimile device, based on the type of data, when receiving the e-mail data;

said controller, in response to a determination that the e-mail data cannot be printed by the facsimile device, extracting the specific information from the e-mail data, and transmitting the specific information to a recipient information terminal apparatus through the interface; and said controller, in response to receipt of an instruction transmitted from the recipient information terminal apparatus to transfer the e-mail, transmitting the e-mail data to the recipient information terminal apparatus, and in response a determination that the e-mail data can be printed by the facsimile device, the controller instructing the converter to convert the e-mail data to facsimile data and instructing the facsimile device to print the facsimile data.

9. A method for receiving e-mail data and printing received e-mail data with a printer, the method comprising:

receiving e-mail data at an interface, the e-mail data comprising image data and specific information, the specific information comprising at least a type of data;

determining whether or not the received data can be printed by the printer based on the type of the e-mail data;

extracting the specific information from the e-mail data;

transmitting the extracted specific information to a recipient information terminal apparatus through the interface in response to a determination that the e-mail data cannot be printed; and transmitting the e-mail data from the interface to the recipient information terminal apparatus in response to receipt of an instruction from the recipient information terminal apparatus to transfer the e-mail.

10. A method for receiving e-mail data and printing received e-mail data with a printer, the method comprising:

receiving e-mail data at an interface, the e-mail data comprising image data and specific information, the specific information comprising at least a type of data;

determining whether or not the received data can be printed by the printer based on a type of the e-mail data;

extracting the specific information from the e-mail data;

transmitting the extracted specific information to a recipient information terminal apparatus through the interface in response to a determination that the e-mail data cannot be printed;

transmitting the e-mail data from the interface to the recipient information terminal apparatus in response to receipt of an instruction from the recipient information terminal apparatus to transfer the e-mail; and printing the e-mail data with the printer in response to a determination that the e-mail data can be printed.

* * * * *